United States Patent
Kulp et al.

(10) Patent No.: US 10,991,014 B2
(45) Date of Patent: Apr. 27, 2021

(54) TEMPLATES AND EVENTS FOR CUSTOMIZABLE NOTIFICATIONS ON WEBSITES

(71) Applicant: Solstice Equity Partners, Inc., New York, NY (US)

(72) Inventors: Ryan Kulp, New York, NY (US); Chris Bacon, Calgary (CA)

(73) Assignee: Solstice Equity Partners, Inc., New York, NY (US)

( * ) Notice: Subject to any disclaimer, the term of this patent is extended or adjusted under 35 U.S.C. 154(b) by 245 days.

(21) Appl. No.: 16/043,155

(22) Filed: Jul. 24, 2018

(65) Prior Publication Data

US 2019/0034982 A1 Jan. 31, 2019

Related U.S. Application Data

(60) Provisional application No. 62/537,032, filed on Jul. 26, 2017.

(51) Int. Cl.
*G06Q 30/02* (2012.01)
*H04L 29/08* (2006.01)
(Continued)

(52) U.S. Cl.
CPC ....... *G06Q 30/0277* (2013.01); *G06F 16/951* (2019.01); *G06F 16/955* (2019.01);
(Continued)

(58) Field of Classification Search
CPC ..... G06Q 30/0277; H04L 67/22; H04L 67/26; H04L 67/42; H04L 67/02; G06F 16/951; G06F 16/955; G06F 16/958
See application file for complete search history.

(56) References Cited

U.S. PATENT DOCUMENTS 6,763,384 B1 * 7/2004 Gupta .................... G06Q 30/08
  709/224
8,457,948 B2 * 6/2013 Waksberg ............. G06F 40/186
  704/8
(Continued)

OTHER PUBLICATIONS

Using Notification Templates, Mar. 22, 2012, https://docs.oracle.com/cd/E28394_01/pt852pbh1/eng/psbooks/twfl/chapter.htm?File=twfl/htm/twfl 14.htm (Year: 2012).*
(Continued)

*Primary Examiner* — Eric R Netzloff
*Assistant Examiner* — Dipen M Patel
(74) *Attorney, Agent, or Firm* — North Shore Patents, P.C.

(57) ABSTRACT

In generating a customized notification on a website, a server receives a request for events from an events database from a browser. Each event includes event parameters for interaction(s) of a user with an instance of the website. The event parameters include a template reference, variable value(s), and a timestamp. The server retrieves an application identifier for the instance of the website from the request, finds events associated with the application identifier, and finds the referenced template. The template includes a message structure with template variables. For each event found, the server parses the event parameters and template variables in the referenced template and replaces the template variables with the variable values in the given event. The server sends an array of event objects to the browser, each including a message with the variable values, a link, and a timestamp.

16 Claims, 12 Drawing Sheets

(51) Int. Cl.
*G06F 16/951* (2019.01)
*G06F 16/955* (2019.01)
*G06F 16/958* (2019.01)
*H04L 29/06* (2006.01)

(52) U.S. Cl.
CPC ............ *G06F 16/958* (2019.01); *H04L 67/22* (2013.01); *H04L 67/26* (2013.01); *H04L 67/02* (2013.01); *H04L 67/42* (2013.01)

(56) References Cited

U.S. PATENT DOCUMENTS

| | | | | |
|---|---|---|---|---|
| 8,760,298 B2* | 6/2014 | Cavanaugh | ............. | H04W 4/18 340/573.1 |
| 9,294,361 B1* | 3/2016 | Choudhary | ......... | H04L 41/0806 |
| 10,305,758 B1* | 5/2019 | Bhide | ................... | H04L 41/147 |
| 10,621,535 B1* | 4/2020 | Lawrence | .......... | G06Q 10/1053 |
| 2008/0215426 A1* | 9/2008 | Guldimann | ............ | G06Q 30/02 705/14.61 |
| 2009/0055725 A1* | 2/2009 | Portnov | ................. | G06Q 30/02 715/234 |
| 2009/0183097 A1* | 7/2009 | Bayiates | ................ | G06F 16/58 715/764 |
| 2012/0036023 A1* | 2/2012 | Das | ........................ | G06Q 30/02 705/14.71 |
| 2013/0007265 A1* | 1/2013 | Benedetti | .............. | G06F 9/5072 709/224 |
| 2013/0117108 A1* | 5/2013 | Spears | ............... | G06Q 30/0255 705/14.53 |
| 2013/0151943 A1* | 6/2013 | Zhu | ..................... | G06F 16/9577 715/234 |
| 2013/0246169 A1* | 9/2013 | Berry | ................. | G06Q 30/0276 705/14.49 |
| 2014/0280515 A1* | 9/2014 | Wei | ..................... | H04L 67/2847 709/203 |
| 2015/0100877 A1* | 4/2015 | Long | ....................... | G06F 9/542 715/234 |
| 2015/0294349 A1* | 10/2015 | Capel | ................ | G06Q 30/0267 705/14.43 |
| 2015/0295759 A1* | 10/2015 | Mollersten | ............ | G06F 16/185 709/222 |
| 2016/0065627 A1* | 3/2016 | Pearl | ...................... | G06F 16/14 709/204 |
| 2016/0301735 A1* | 10/2016 | Lind | ................. | H04M 15/8083 |
| 2017/0099592 A1* | 4/2017 | Loeb | .................... | G06Q 10/107 |
| 2017/0201850 A1* | 7/2017 | Raleigh | ................. | G06F 3/0482 |
| 2018/0103004 A1* | 4/2018 | Demir | .................... | H04L 51/16 |
| 2018/0365309 A1* | 12/2018 | Oliner | ................. | H04L 41/0681 |

OTHER PUBLICATIONS

Dynamic Fields, Jun. 23, 2016, https://docs.opsgenie.com/docs/draggable-fields (Year: 2016).*

Kennan Payne, Displaying Dynamic Messages Using the Web Notification API, Dec. 7, 2016, https://www.sitepoint.com/browser-notification-api/ (Year: 2016).*

Template literals, May 6, 2016, https://developer.mozilla.org/en-US/docs/Web/JavaScript/Reference/Template_literals (Year: 2016).*

"Fast, Global Content Delivery Network", retrieved from [https://www.cloudflare.com/cdn/] on Jul. 23, 2018.

"What is a CDN Edge Server?", retrieved from [https://www.cloudflare.com/learning/cdn/glossary/edge-server] on Jul. 23, 2018.

* cited by examiner

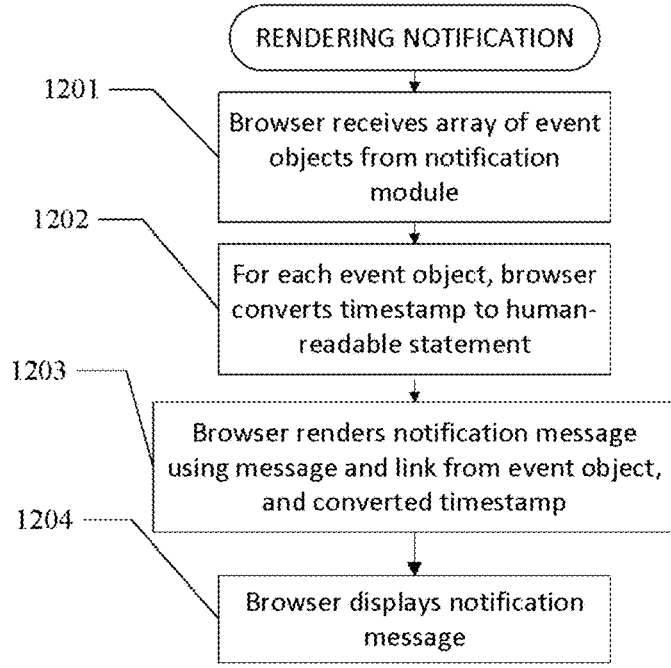
FIG. 12
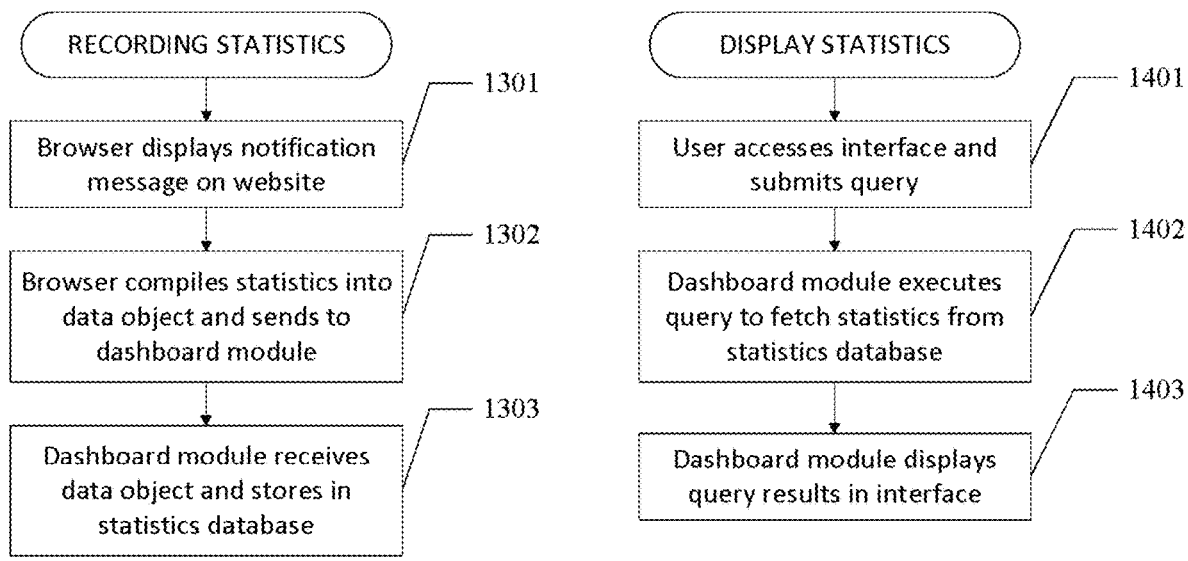
FIG. 13
FIG. 14

TEMPLATES AND EVENTS FOR CUSTOMIZABLE NOTIFICATIONS ON WEBSITES

BACKGROUND OF THE INVENTION

E-commerce websites rely on their ability to encourage live website visitors to perform certain actions to be successful. The desired visitor behavior can include a sale, a product review, sharing on social media platforms, etc. One way to encourage the desired behavior is to inform the visitor of similar behavior by other visitors. However, conventional techniques do not provide a meaningful and flexibility way to notify the visitor of such behavior.

BRIEF SUMMARY OF THE INVENTION

Disclosed herein is a method for generating customizable notifications on a website, and a corresponding system and a computer program product, as specified in the independent claims. Embodiments of the present invention are given in the dependent claims. Embodiments of the present invention can be freely combined with each other if they are not mutually exclusive.

According to one embodiment of the present invention, server receives a request for events from an events database from a browser at a client device. Each event includes event parameters for at least one interaction of a user with an instance of the website. The event parameters include a reference to a template, one or more variable values, and a timestamp. The server retrieves an application identifier for the instance of the website from the request. The server finds one or more events in the events database associated with the application identifier and finds the template in a templates database referenced by each event. The template includes a message structure comprising one or more template variables. For each given event found, the server parses the event parameters in the given event and template variables in a given template referenced by the given event and replaces the template variables in the message structure in the given template with the variable values in the given event. The server sends an array of event objects to the browser, where each event object includes a message that includes the variable values, a link, and the timestamp from the given event.

In one aspect of the present invention, the server determines whether a given template variable in the message structure in the given template has a corresponding value in the event parameters in the given event. When there is a corresponding value, the server replaces the given template variable with the corresponding value in the event parameters. When there is no corresponding value, the server replaces the given template variable with a default value.

In one aspect of the present invention, the given template variable includes a pre-defined variable or a user-defined variable. The pre-defined variable is supported by the server and available to users without additional user configuration, and the user-defined variable is defined by a second user.

In one aspect of the present invention, the server determines whether the message structure in the given template includes a key. When the message structure includes the key, the server finds a custom event field in a custom event fields database including an event identifier matching the given event and replaces the key in the messages structure with a value paired with the key in the custom event field.

In one aspect of the present invention, the event parameters of the given event further includes a uniform resource locator (URL). The server determines whether the message structure in the given template includes a special variable. When a special variable is included, the server combines one of the template variables with the URL in the event parameters of the given event to form the link.

In one aspect of the present invention, the link includes one or more tracking parameters.

In one aspect of the present invention, the browser receives the array of event objects from the server. For each given event object in the array, the browser converts the timestamp to a human-readable statement. The browser renders a notification message using the message and link from the given event object and the converted timestamp and displays the notification message to a second user interacting with a second instance of the website.

In one aspect of the present invention, the server receives event data for the interaction of the user with the instance of the website. The server creates the given event with the event parameters based on the event data and searches the templates database for the given template identified in the event data. When the given template is found, the server stores the given event in the events database. When the given template is not found, the server generates an error message.

In one aspect of the present invention, when the given template is found in the templates database, the server determines whether each template variable in the given template has a corresponding variable value in the event parameters in the given event. When there is a corresponding variable value, the server stores the given event in the events database. When there is no corresponding variable value, the server determines whether a fall back value is configured for the given template variable. When the fall back value is not configured, the server ignores the event data. When the fall back value is configured, the server stores the given event in the events database with the fall back value.

In one aspect of the present invention, a second browser receives the given template that includes template parameters, where the template parameters include the message structure including the template variables. The second browser parses and validates the template variables. When any of the template variables are not valid, the second browser generates an error message. When the template variables are valid, the server parses and identifies any user-defined variables in the message structure and stores the given template comprising the user-defined variables in the templates database.

BRIEF DESCRIPTION OF THE SEVERAL VIEWS OF THE FIGURES

FIG. 12 illustrates an exemplary method of rendering notifications according to some embodiments.

FIG. 13 illustrates an exemplary method of recording statistics according to some embodiments.

FIG. 14 illustrates an exemplary method of displaying statistics according to some embodiments.

DETAILED DESCRIPTION OF THE INVENTION

Figure 1:
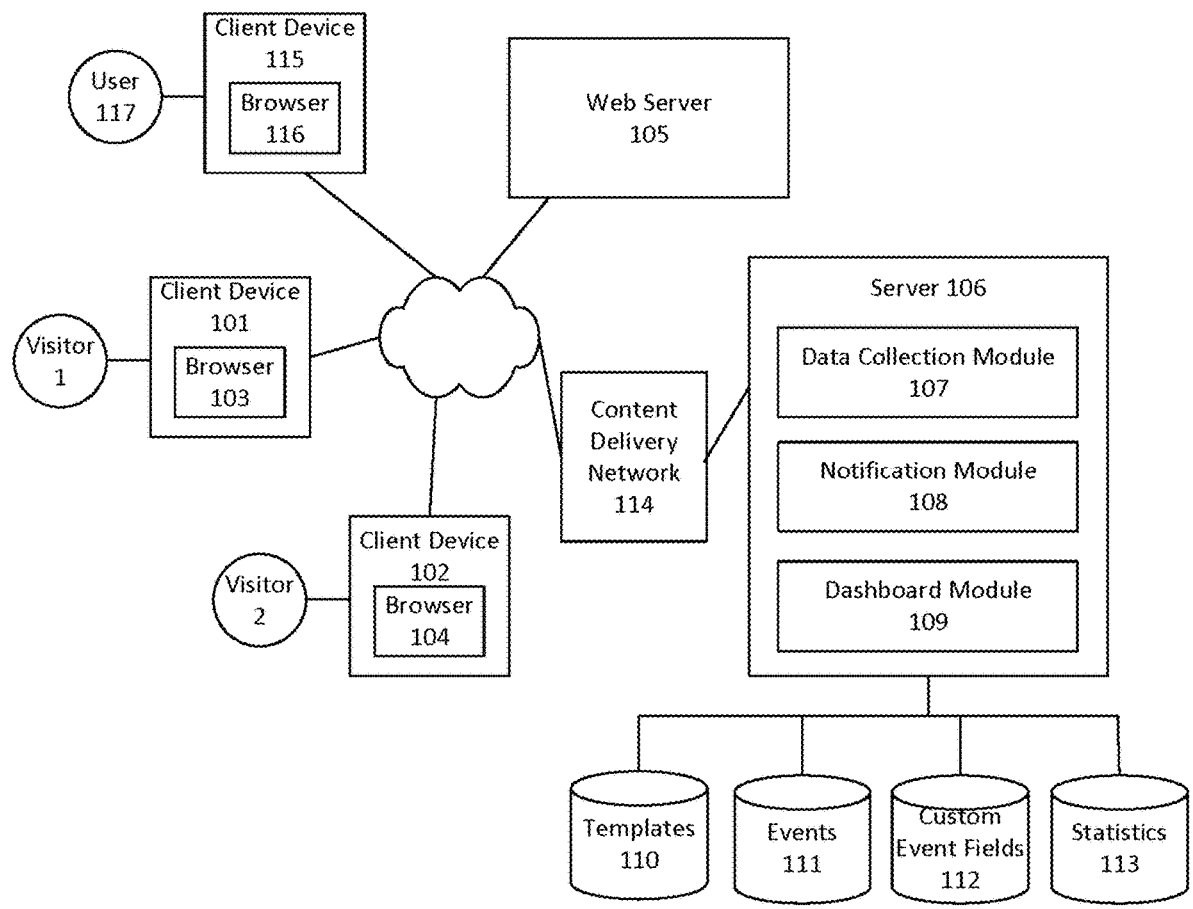
FIG. 1 illustrates an exemplary network environment according to some embodiments.

The present invention provides a method of using templates and events for customizable notifications on websites. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an exemplary network environment according to some embodiments. The environment includes one or more client devices 101-102, each with a browser 103-104. Each visitor client device 101-102 may access a website, hosted by a web server 105, that integrates customizable notifications provided by a server 106. The notifications are customizable by a user 117 via a client device 115 with a browser 116. The user 117 may be, for example, a website administrator. In some embodiments, customizable notification messages are integrated through computer code, e.g. Javascript snippet, executable by a browser 103-104 at the client device 101-102. The execution of this code is referenced herein as functionality performed by the "browser". The server 106 includes at least a data collection module 107, a notification module 108, and a dashboard module 109. The data collection module 107 receives or collects event data sent by a browser 103 for interactions with the website by a user (e.g. Visitor 1 or Visitor 2). The data collection module 107 processes the event data, creates events, and stores the events in an events database 111. The notification module 108 processes requests for events from a browser 104, retrieves relevant events from the events database 111, templates from the template database 110, and custom event fields from the custom event fields database 112. Events, templates, and custom event fields are described further below. The events, templates, and custom event fields are used to create event objects that contain data used to render notification messages. The browser 104 renders the notification messages using the data in the event objects, and the notification messages are then displayed to a user (e.g. Visitor 2) by the browser 104. The event data can be captured by the browser 103 through various channels, including ecommerce point-of-sale data, product reviews from third parties, and visitor analytics. In some embodiments, the event data relates to recent website conversations, such as a combination of name, location, product purchased, review given, number of times viewed, etc. The dashboard module 109 collects statistics related to the notification messages and stores the statistics in a statistics database 113. The dashboard module 109 provides an interface through which the user 117 may fetch and review the statistics.

Optionally, the network environment may further include a content delivery network (CDN) 114, such the CDN provided by Cloudflare™. The CDN 114 cache requests for events from browsers, which allows the server 106 to be required to process fewer requests by saving a copy of the data in the CDN 114. Requests are routed through the CDN 114 and, based on the configuration, the CDN 114 will either respond by caching the data or routing the request to the server 106. One example CDN configuration sets the caching period during which a copy of the data will be saved before requests are routed to the server 106. The CDN 114 caches application and event data. This data is stored by the CDN 114 until the server 106 requests that the cache be refreshed, which causes requests from browsers to the server 106 to retrieve the most current application or event data. During the caching period, when new events are created on the server 106, the data copy saved in the CDN 114 needs to the updated. In order to do this, the server 106 sends a request to the CDN 114 to expire the cache, causing the next request from the browser to be routed through from the CDN 114 to the server 106. The CDN 114 stores this new data again for the duration of the caching period or until the server 106 requests an expiration. In an exemplary embodiment, when user settings are updated, the server 106 sends a request to clear the CDN cache of application data, and when events are updated, the server 106 sends a request to clear the CDN cache of event data. In this manner, stale data are forced to be purged, allowing for more timely implementation of changes.

Figure 2:
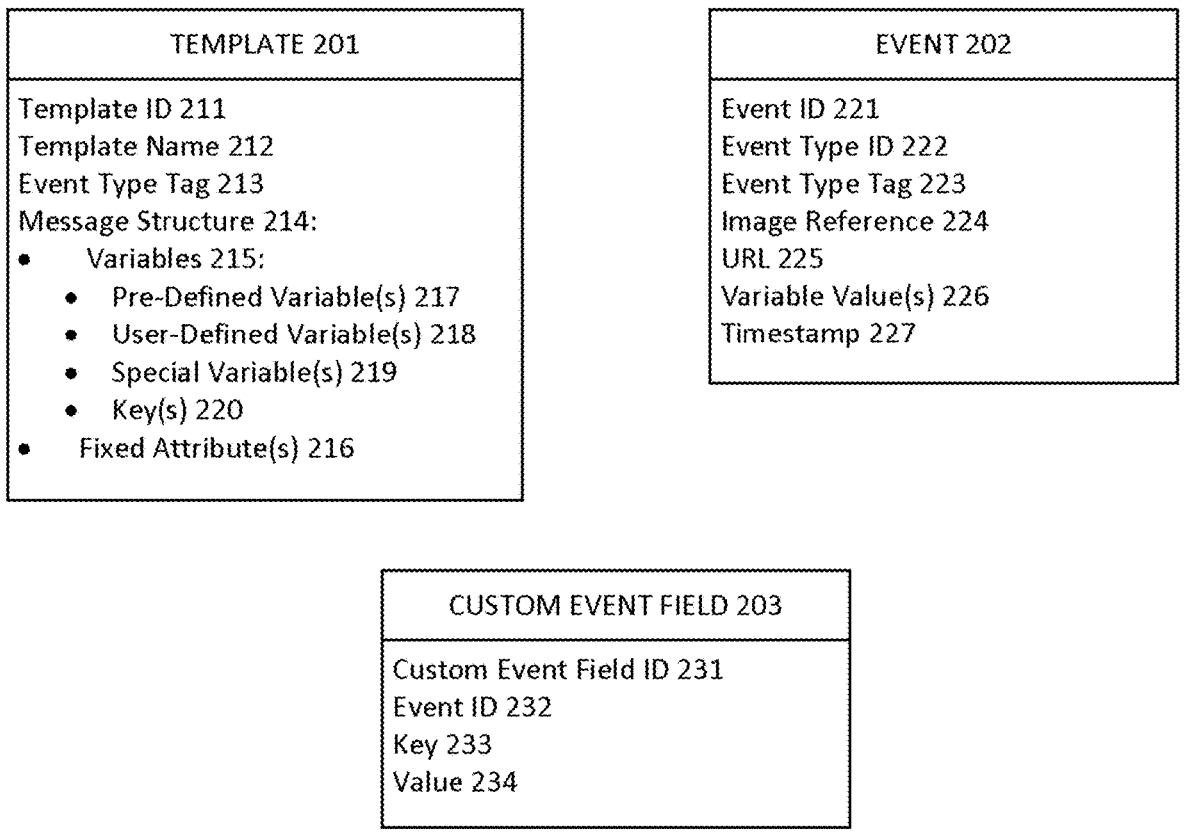
FIG. 2 illustrates exemplary embodiments of templates, events, and custom event fields according to some embodiment.

FIG. 2 illustrates exemplary embodiments of templates, events, and custom event fields according to some embodiment. Templates 201, events 202, and custom event field 203 are configurable by the user 117. In some embodiments, a template 201 may include, but is not limited to, the following parameters: a template identifier (ID) 211; a template name 212; an event type tag 213; and a message structure 214. The template ID 211 uniquely identifies the template 201. The template name 212 is a string-based reference to the template 201. The event type tag 213 is a value that may be used by events to reference the template 201. The message structure 214 defines the notification message that will be rendered and can be defined with a combination of one or more variables 215 and one or more fixed attributes 216. The variables 215 may include any combination of: one or more pre-defined variables 217; one or more user-defined variables 218; one or more special variables 219; and one or more keys 220. Pre-defined variables 217 are supported by the notification service and available to users without additional user configuration. User-defined variables 218 are variables defined by the user 117. In an exemplary embodiment, the user 117 creates a custom variable by placing any combination of words inside a double curly brace notation {{ . . . }}. The combination of words become the custom variable name. Special variables 219, or links, combine a pre-defined variable 217 or user-defined variable 218 with a URL in the event 202 to make the combination "clickable" inside a notification message. In an exemplary embodiment, the special variable or link also incorporates tracking parameters. The key 220 references a custom event field 203 associated with an event 202, as described further below.

An event is created to capture interactions by a visitor with the website. In some embodiments, an event 202 may include, but is not limited to, the following parameters: an event ID 221; an event type ID 222; an event type tag 223; an image reference 224; a URL 225; one or more variable values 226; and a timestamp 227. The event ID 221 uniquely identifies the event 202. The event type ID 222 associates the event 202 with a template 201 by setting the event type ID 222 equal to the template ID 211. The event type tag 223 is an alternative manner of referencing the template 201, by setting the event type tag 223 in the event 202 equal to the event type tag 213 in the template 201. The image reference 224 sets the image to be used in rendering the notification message, if any. The URL defines the website to which a visitor is directed when the visitor selects or "clicks" on the notification message. The variable values 226 provide the values of the variables 215 in the message structure 214. The timestamp 227 is set to the creation time of the event 202.

A custom event field 203 is a user-defined dynamic variable. In some embodiments, a customer event field 203 may include, but is not limited to, the following parameters: custom event field ID 231; an event ID 232; a key 233; and a value 234. The custom event field ID 231 uniquely identifies the customer event field 203. The event ID 232 identifies the event 202 to which the custom event field 203 is associated, by setting the event ID 232 equal to the event ID 221 of the event 202. The key 233 is a reference to the custom event field 203 that may be used in a message structure 214 defined in the template 201. The key 233 is paired with a value 234, with which the key in the message structure 214 will be replaced.

Figure 3:
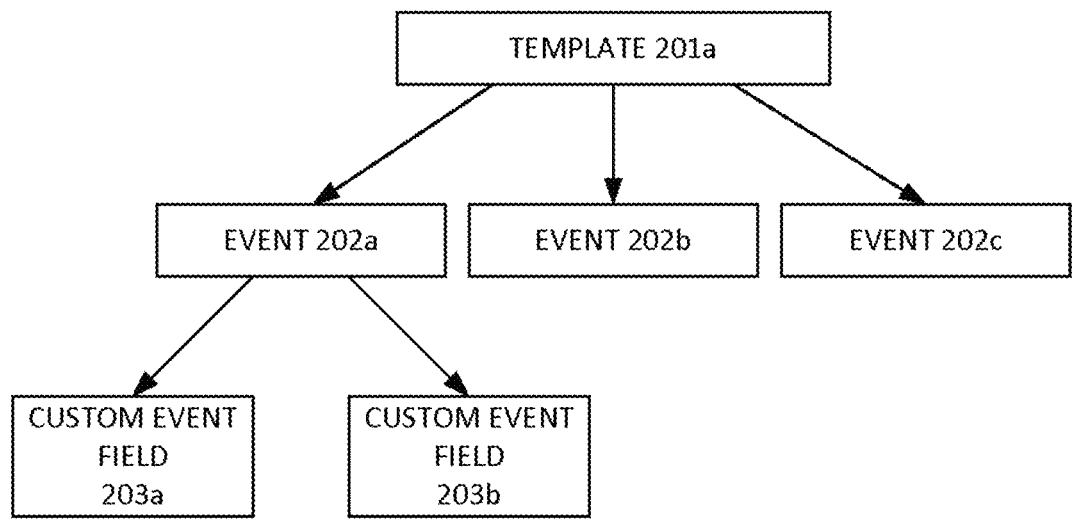
FIG. 3 illustrates relationships between templates, events, and custom event fields according to some embodiments.
Figure 3:
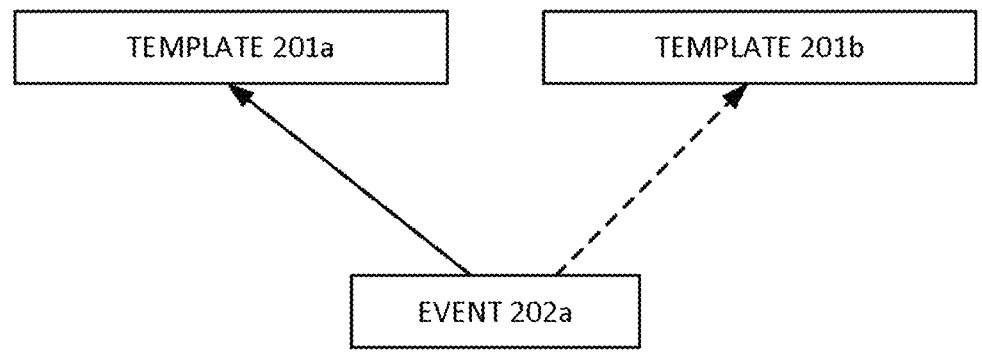

FIG. 3 illustrates relationships between templates, events, and custom event fields according to some embodiments. One or more events 202*a*-202*c* may be associated with the same template 201*a*, where the event type ID 222 or event type tag 223 in each event 202*a*-202*c* is set to the template ID 211 or event type tag 213, respectively, of the template 201*a*. A given event 202*a*, however, can only be associated with one template 201*a* or 201*b* at a time. One or more custom event fields 203*a*-203*b* may be associated with the same event 202*a*, where the event ID 232 in each custom event field 203*a*-203*b* is set to the event ID 221 of the event 202*a*.

Figure 4A:
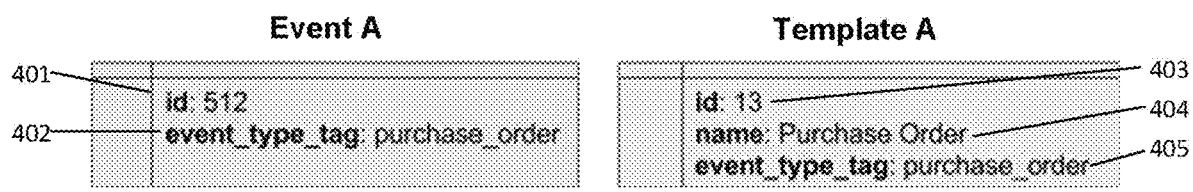
FIGS. 4A-4B illustrate a first example relationship between templates and events according to some embodiments.
Figure 4B:
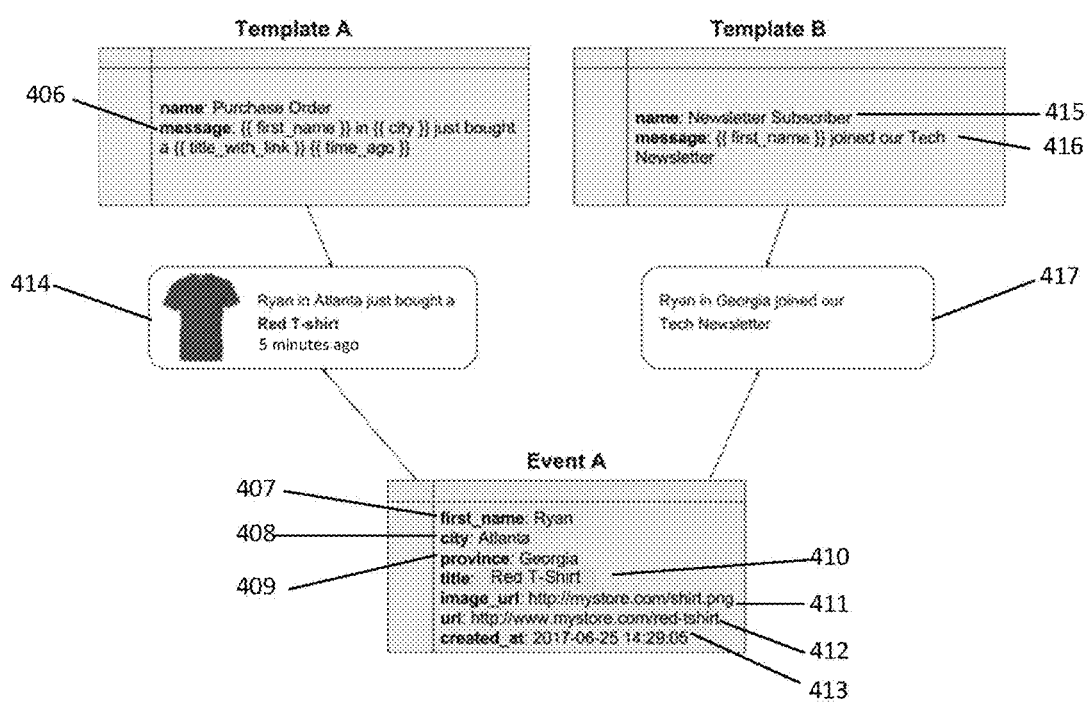

FIGS. 4A-4B illustrate a first example relationship between templates and events according to some embodiments. As illustrated in FIG. 4A, assume that Event A and Template A have been created. Event A is defined with an event ID=512 (401) and an event type tag="purchase_order" (402). Template A is defined with a template ID=13 (403), template name="Purchase Order" (404), and event type tag="purchase_order" (405). Event A associated with Template A through the event type tag 402 being set equal to the event type tag 405. As illustrated in FIG. 4B, Template A is further defined with the message structure: "{{first name}} in {{city}} just bought a {{time with link}} {{time ago}}" (406). Assume in this example that a visitor (Ryan) purchase a red t-shirt on the website and Event A is created to capture data related to this purchase. Event A includes the following variable values: first name="Ryan" (407), city="Atlanta (408), province="Georgia" (409), and title="Red T-Shirt" (410). Event A is further includes an image reference of "mystored.com/shirt.png" (411), a URL of "mystore.com/red-tshirt" (412), and a timestamp="2017-06-25 14:29:05" (413). The variables in the message structure 406 are substituted with the variable values in Event A, resulting in the rendering of the notification message 414.

Continuing with FIG. 4B, assume that the event type tag 402 of Event A is instead set to the event type tag (not shown) of Template B (415). Template B is defined with the message structure: "{{first_name}} joined our Tech Newsletter" (416). When Event A is associated with Template B, the notification message 417 is rendered. Since the messages structure 416 in Template B does not contain variables other than "first_name", the other values in Event A are not used in rendering the notification message 417.

Figure 5:
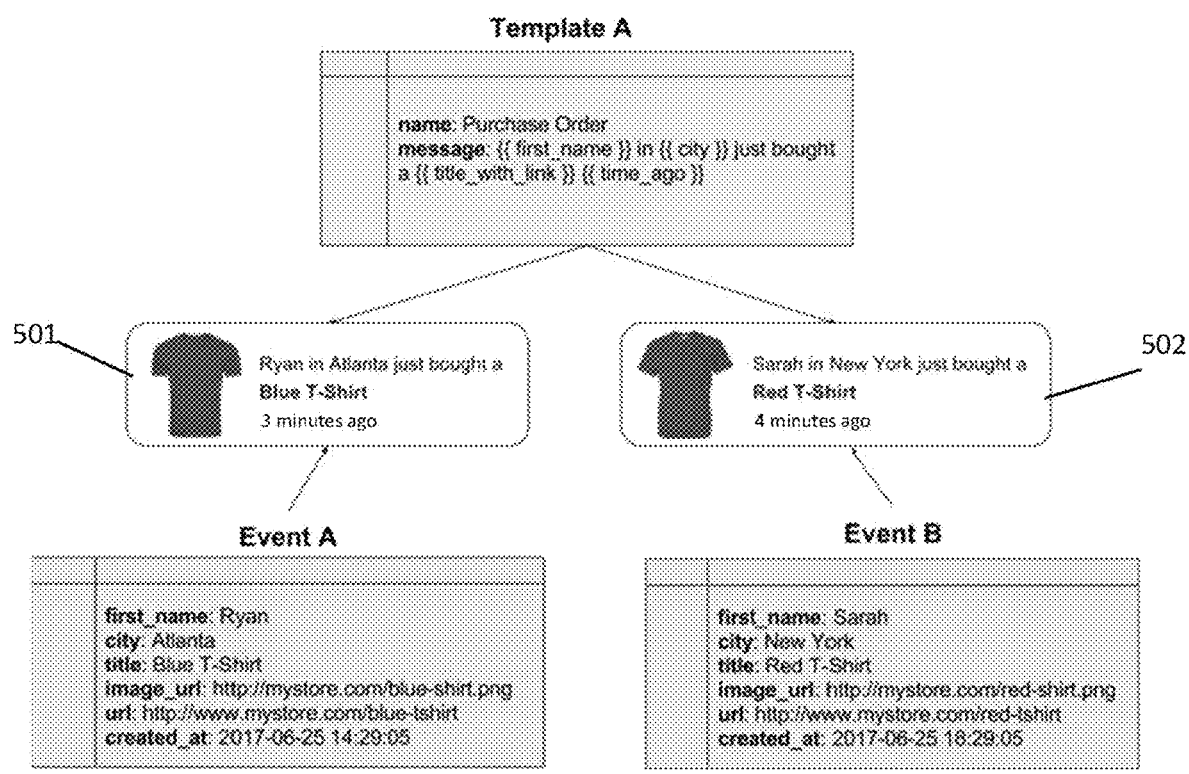
FIG. 5 illustrates a second example relationship between templates and events according to some embodiments.

FIG. 5 illustrates a second example relationship between templates and events according to some embodiments. In this example, Event A and Event B are both associated with Template A, by setting the event type ID or the event type tag of Events A and B equal to the template ID of Template A (not shown). Assume that Ryan purchases a blue t-shirt on the website, while Sarah purchases a red t-shirt on the website. In response, Event A is created for Ryan's purchase, and Event B is created for Sarah's purchase, as illustrated. The combination of Event A and Template A results in the rendering of the notification message 501, while the combination of Event B and Template A results in the rendering of the notification message 502. In this manner, a single template can be used to create multiple, unique notifications given different events.

Figure 6:
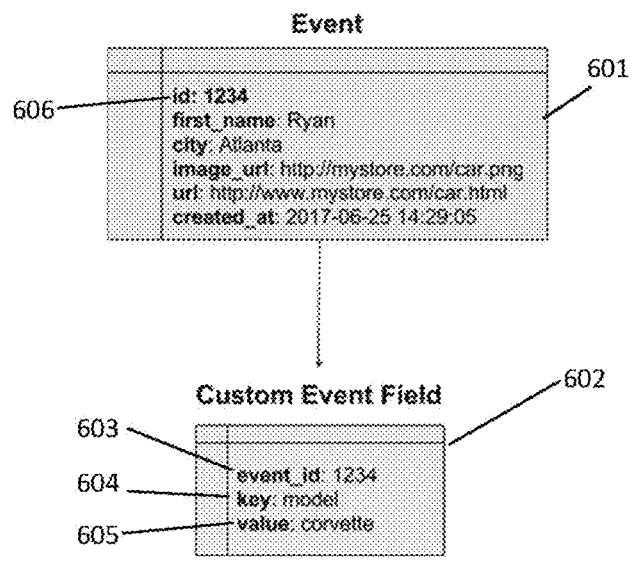
FIG. 6 illustrates an example relationship between events and custom event fields according to some embodiments.

FIG. 6 illustrates an example relationship between events and custom event fields according to some embodiments. In this example, assume that Event 601 has been created. The user also creates a custom event field 602 to define a variable "model" by setting key=model (604). The value of "model" is set to "corvette" by setting value=corvette (605). The custom event field 602 is associated with the event 601 by setting the event ID 603 equal to the event ID 606 of the Event 601.

Figure 7:
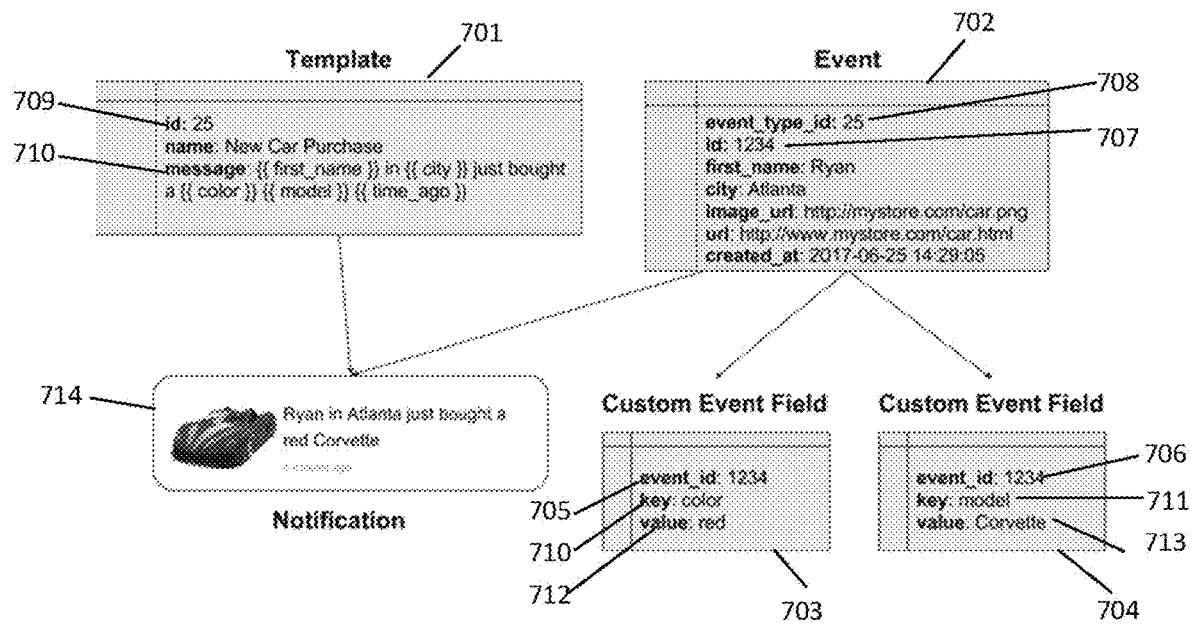
FIG. 7 illustrates an example relationship between templates, events, and custom event fields according to some embodiments.

FIG. 7 illustrates an example relationship between templates, events, and custom event fields according to some embodiments. In this example, two custom event fields 703-704 are created and associated with the same event 702, where the event ID 705-706 of each custom event field 703-704 is set equal to the event ID 707 of the event 702. The event 702 is associated with the template 701 by setting the event type ID 708 in the event 702 equal to the template ID 709 of the template 701. The message structure 710 in the template 701 includes the keys 710-711, "color" and "model". The corresponding values 712-713, "red" and "Corvette", in the custom event fields 703-704 associated with the event 702 that references the template 701 are substituted for the keys in the message structure 710. Further, the other variables in the message structure 710 are substituted with the variable values in the event 702, resulting in the notification message 714.

Figure 8:
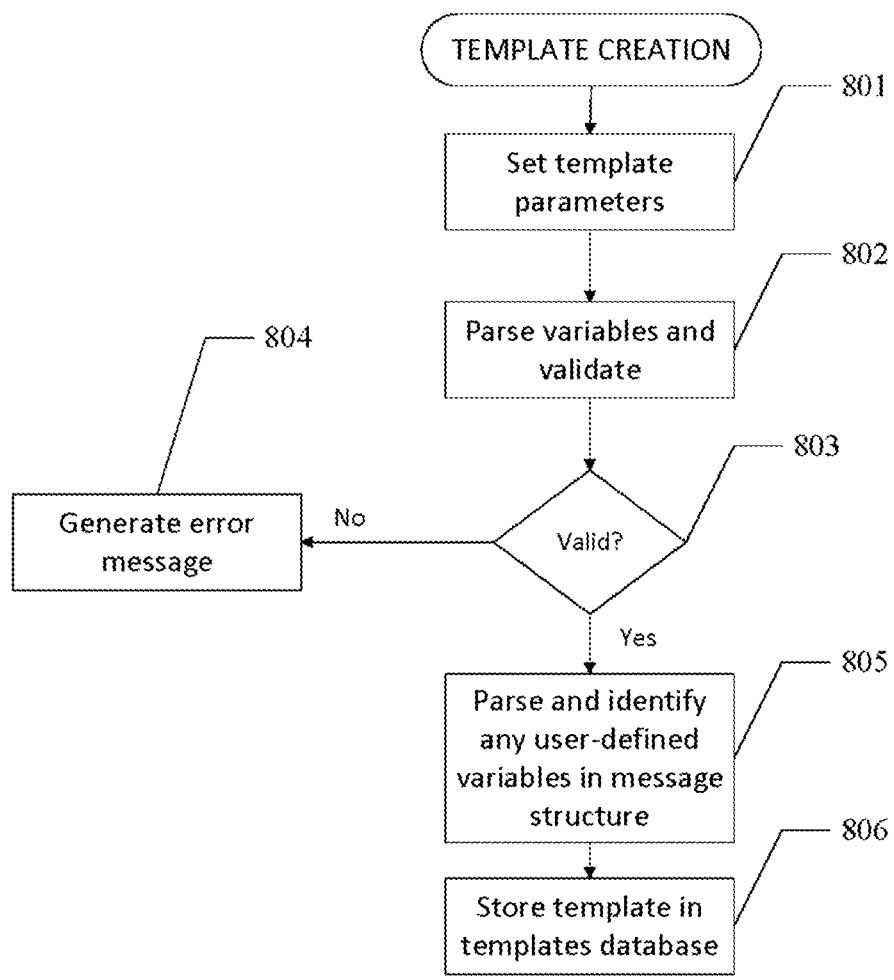
FIG. 8 illustrates an exemplary method of template creation according to some embodiments.

FIG. 8 illustrates an exemplary method of template creation according to some embodiments. The user 117 sets the parameters in the template 201, including the messages structure (801). In an exemplary embodiment, the variables in the message structure are set by placing variable names inside double curly brace notations, {{ . . . }}. Other syntactic notations can also be used. The variables in the template 201 are parsed and validated (802). In an exemplary embodiment, the validation is performed by the browser 116. For example, a variable can be deemed invalid due to incorrect syntax. Alternatively, the validation can be performed by the server 106. If any of the variables are invalid (803), then the browser 116 (or server 106) generates an error message (804), and the template is not saved in the templates database 110. Otherwise, if the validation was performed by the browser 116, the template 201 is sent to the server 106. The server 106 parses and identifies any user-defined variables in the message structure 214 of the template 201 (805). The user-defined variable are stored as a template parameter. The template 201 is then saved in the templates database 110 (806).

An exemplary algorithm for parsing and identifying user-defined variables in the message structure of a template is set forth below:

merge_variable_finder=/{{\s{0,2}(\b#{variable}\b)
    (?<=\|)?(.*?)(?=\})?\s{0,2}}}/ where:
"{{" matches the characters {{ literally (case sensitive)
"\s{0,2}" matches any whitespace character (equal to [\r\n\t\f\v])
    {0,2} Quantifier—Matches between 0 and 2 times, as many times as possible, giving back as needed (greedy)

1st Capturing Group
"(\b#{variable}\b)"
    \b assert position at a word boundary (^\w|\w$|\W\w|\w\W)
    variable matches the characters variable literally (case sensitive)
    \b assert position at a word boundary (^\w|\w$|\W\w|\w\W)
2nd Capturing Group
(<=\|)?
    ? Quantifier—Matches between zero and one times, as many times as possible, giving back as needed (greedy)
    <= matches the characters <= literally (case sensitive)
    \| matches the character | literally (case sensitive)
3rd Capturing Group
(.*?)
    .*? matches any character (except for line terminators)
    *? Quantifier—Matches between zero and unlimited times, as few times as possible, expanding as needed (lazy)
4th Capturing Group
"(=\})?"
    ? Quantifier—Matches between zero and one times, as many times as possible, giving back as needed (greedy)
    "=" matches the character—literally (case sensitive)
    "\}" matches the character} literally (case sensitive)
"\s[0,2]" matches any whitespace character (equal to [\r\n\t\f\v])
    {0,2} Quantifier—Matches between 0 and 2 times, as many times as possible, giving back as needed (greedy)
    "}}" matches the characters }} literally (case sensitive)

In an exemplary embodiment, in addition to supporting user-defined variables, "filters" can also be supported. Filters, as used herein, allows the user 117 to adjust the look and feel of specific variables. Here, filters are indicated syntactically by adding a "|" (pipe), then a space, then the filter name. Example filters may include, but are not limited to one or more of the following:
Number
{{variable number}}//Formats numbers as comma-separated
Truncation
{{variable truncate}}//Reduces the variable's length to preset number of characters
{{variable truncate ##}}//Reduces the variable's length by specified number of characters
Replace
{{variable|replace[argument1, argument2]}}//replaces argument1 with argument2
Delete
{{variable|delete [char]}}//deletes specified characters in a template variable
{{variable delete_?[char]}}//deletes specified one of multiple instances of a character
Trimming
{{variable|trim_after [char]}}//truncates variable with variable length after a character
{{variable|trim_before [char]}}//truncates variable with variable length before a character
Colors
{{variable color #}}//modifies variable's color value (#)
Default Fallbacks
{{variable|fallback [value]}}//sets fallback value for a variable Random Fallbacks
{{variable|fallback_random [value1,value2]}}//sets group of possible fallback values
Bold
{{variable|bold}}//bolds variable's value in notification message
Casing
{{variable|propercase}}//sets case of variable's value in notification message
{{variable|upcase}}
{{variable|downcase}}

Figure 9:
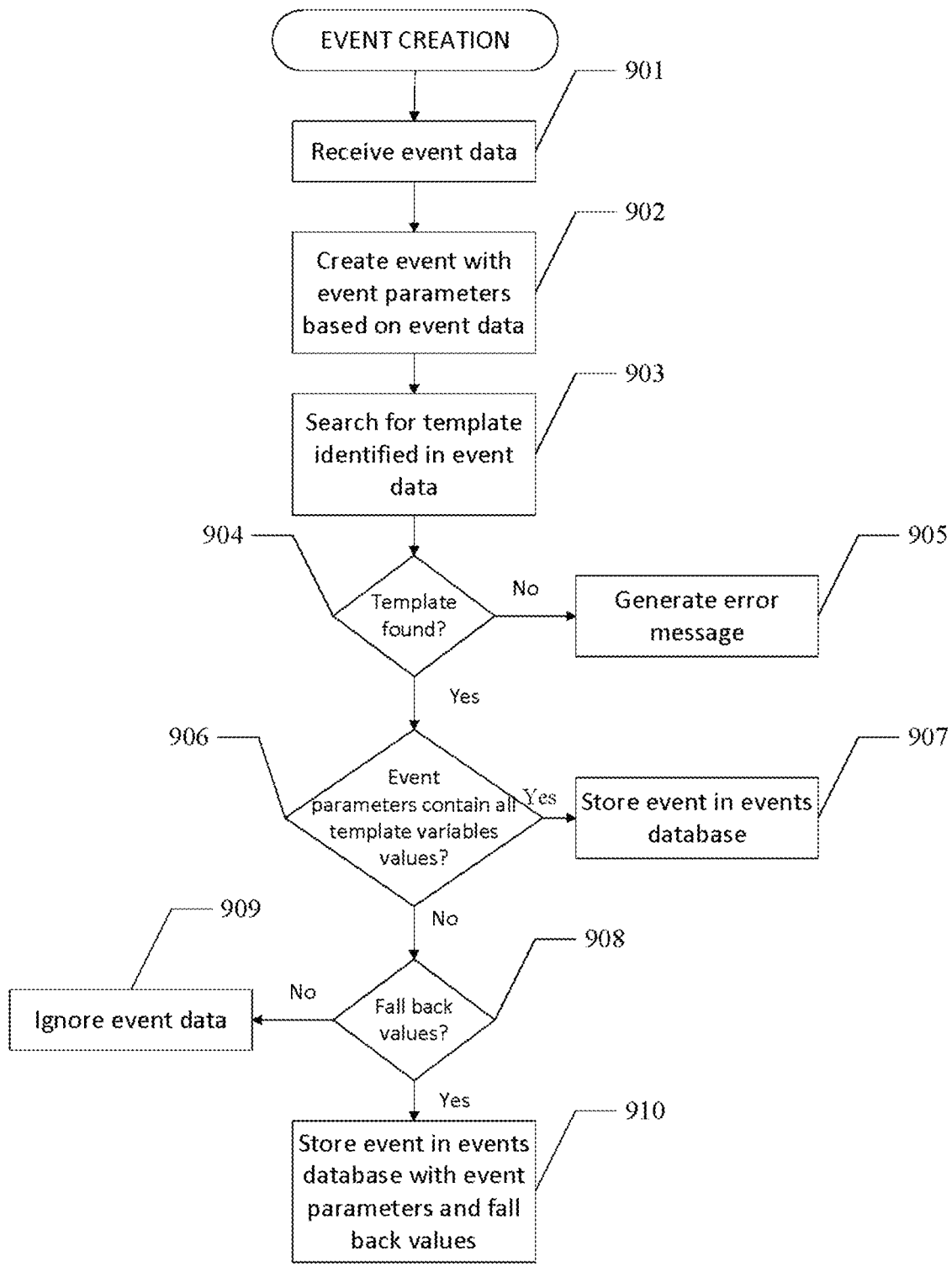
FIG. 9 illustrates an exemplary method of event creation according to some embodiments.

FIG. 9 illustrates an exemplary method of event creation according to some embodiments. When an interaction by a visitor with a website occurs at a client device 101, the browser 103 captures this event and sends the event data to the server 106. For example, the browser may be configured to "listen" for specific interactions, such as user inputs into a web form. The data collection module 107 receives the event data (901) and creates an event 202 with parameters based on the event data (902). In an exemplary embodiment, the browser 103 sends an HTTP POST request to generate the event. The data collection module 107 identifies the template 201 in the event data, specifically the event type ID 222 or the event type tag 223 in the event 202 created based on the event data, and searches the templates database 110 for a matching template 201 (903). If the template is not found in the templates database 110 (904), the data collection module 107 generates an error message (905). Otherwise, the data collection module 107 retrieves the matching template 201 and determines whether the parameters in the event 202 contain values for all of the variables in the template 201 (906). If so, then the event is stored in the events database 111 (907). If any of the variables in the template do not have a value in the event parameters, the data collection module 107 determines whether fall back values, or default values, are defined for these variables (908). If not, then the data collection module 107 ignores the event data (909) and an error message may be generated. Optionally, the event data may be stored in the events database 111 and tagged as an error. The events tagged as errors can then be used for auditing or reporting purposes but are not used to create notification messages. If fall back values are defined (908), then the event is saved in the events database 111 with the event parameters and fall back values (910).

Figure 10:
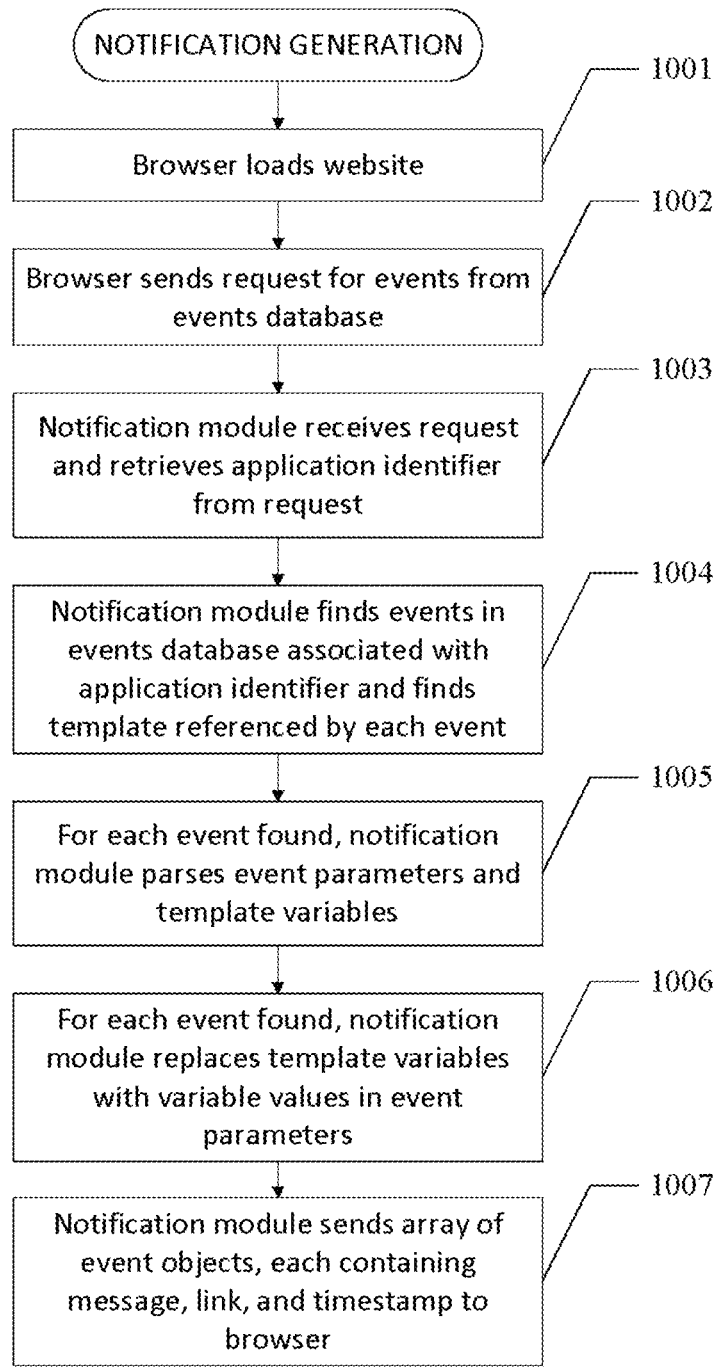
FIG. 10 illustrates an exemplary method of notification generation according to some embodiments.

FIG. 10 illustrates an exemplary method of notification generation according to some embodiments. The browser 104 at a client device 102 loads a website configured with the notification generation according to the present invention (1001). The browser 104 sends a request for events from the events database 111 (1002). In response to the request, the notification module 108 retrieves an application identifier from the request (1003). The application identifier identifies a specific website instance. In an exemplary embodiment, the browser 104 sends a fetch URL to invoke a method to fetch the events, and the fetch URL includes a parameter identifying the application. The notification module 108 finds events in the events database 111 that are associated with the application and finds the template referenced by each event (1004). For example, the events can include interactions by Visitor 1 with a different instance of the website via browser 103 at client device 101. For each event found, the notification module 108 parses the event parameters and template variables (1005) and replaces the template variables with the variable values event parameters (1006). The template variable replacement is described further below with reference to FIG. 11. The notification module 108 creates and sends an array of event objects to the browser 104, where each event object contains a message (with the variable values), a link, and a timestamp (1007). Here, the link is a special variable 219, formed by combining a pre-defined variable 217 or user-defined variable 218 in the template 201 with the URL 225 in the corresponding event 202.

Figure 11:
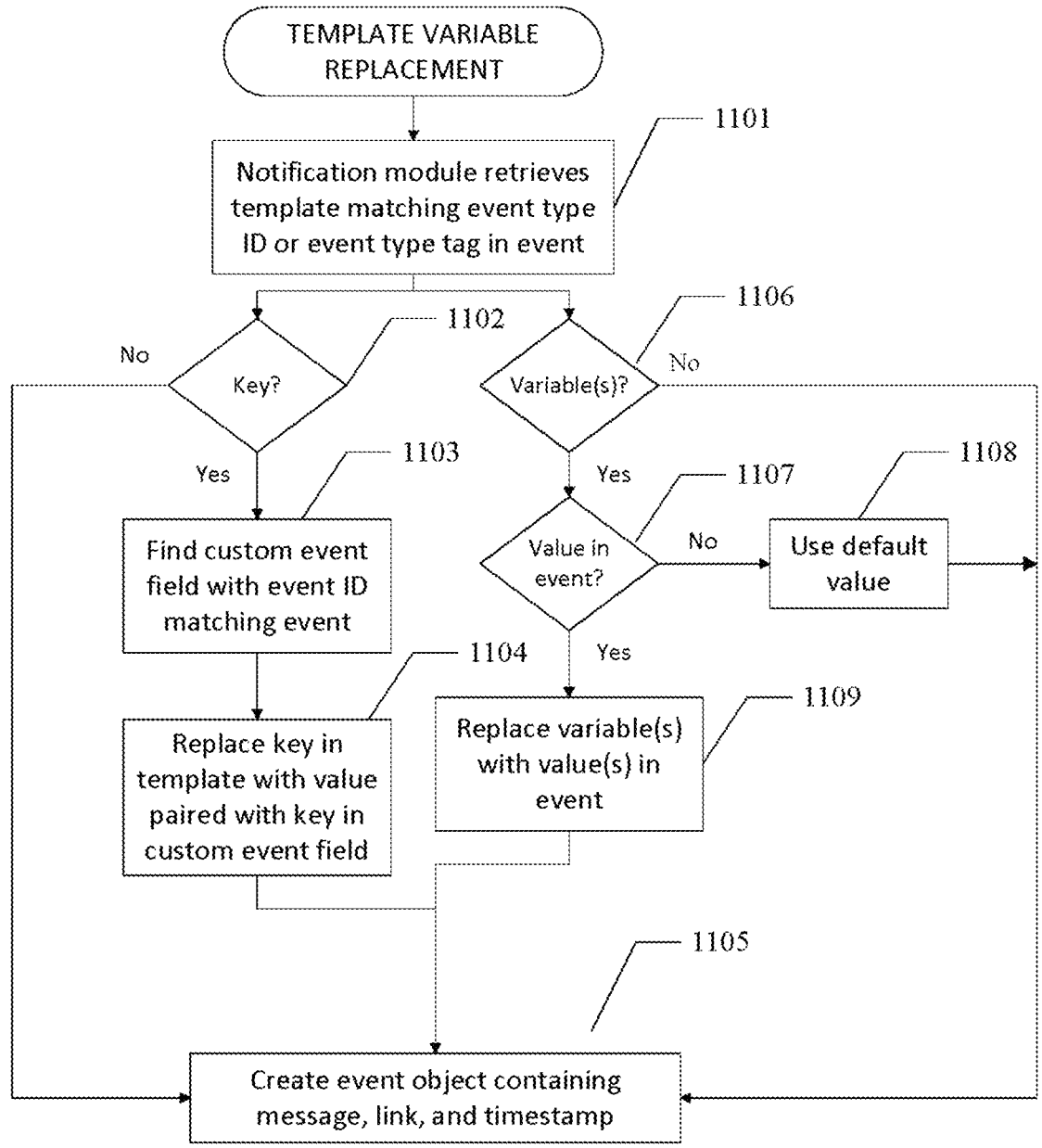
FIG. 11 illustrates an exemplary method of template variable replacement according to some embodiments.

FIG. 11 illustrates an exemplary method of template variable replacement according to some embodiments. The notification module 108 loads the template 201 containing the template ID 211 or event type tag 213 matching the event type ID 222 or event type tag 223, respectively, in the event 202 (1101). When the message structure 214 in the template 201 includes a key 220 (1102), the notification module 108 finds a custom event field 203 with an event ID 232 matching the event ID 221 of the event 202 (1103). The key 220 in the message structure 214 is replaced with the value 234 paired with the key 233 in the custom event field 203 (1104). Blocks 1102-1104 are repeated for each key in the message structure 214. When the template 201 includes variables 215 (1106), the notification module 108 determines whether the value of each variable 215 is in the event 202 (1107). For each variable 215 with a value found in the event 202, the notification module 108 replaces the variable 215 with the value in the event 202 (1109). This includes the combining of a variable 217 or 218 with the URL 225 in the event 202 to form the link, which is substituted for the special variable 219. For each variable 215 with no corresponding value in the event 202, a default value can be used (1108). If no default value has been defined, then the creation of the notification message fails. The notification module 108 creates the event object containing the message with the variables values, the link, and the timestamp 227 of the event 202 (1105).

FIG. 12 illustrates an exemplary method of rendering notifications according to some embodiments. The browser 104 receives the array of event objects from the notification module 108 (1201). For each event object, the browser 104 converts the timestamp in the event object into a human-readable statement (1202). In an exemplary embodiment, the timestamp is delivered in Epoch syntax, e.g., "1500824609", which is converted to a human-readable statement, e.g., " . . . 5 minutes ago". The browser 104 renders the notification message using the message and link from the event object and the converted timestamp (1203). The browser 104 then displays the notification message on the website (1204), such as by overlaying the notification message on the website for a certain period of time.

In addition to capturing event data and rendering notification messages as set forth above, the dashboard module 109 may further record statistics. FIG. 13 illustrates an exemplary method of recording statistics according to some embodiments. Whenever a notification message is displayed on a website (1301), the browser 104 compiles statistical parameters into a data object (1302). Example statistical parameters may include, but are not limited to, any combination of one or more of the following: browser IP address; device type; timestamp; statistic type; message variables in notification; template ID; event ID; and application ID. and sends the data object to the dashboard module 109 (1303). The dashboard module 109 receives the data object and stores the data object in the statistics database 113 (1304).

FIG. 14 illustrates an exemplary method of displaying statistics according to some embodiments. The dashboard module 109 provides an interface through which a user may view statistics stored in the statistics database 113. The user 117 accesses the interface via the browser 116 and submits a query (1401). The dashboard module 109 services the query and fetches the requested statistics from the statistics database 113 (1402). The dashboard module 109 then displays the statistics in the query results in the interface (1403).

Figure 15:
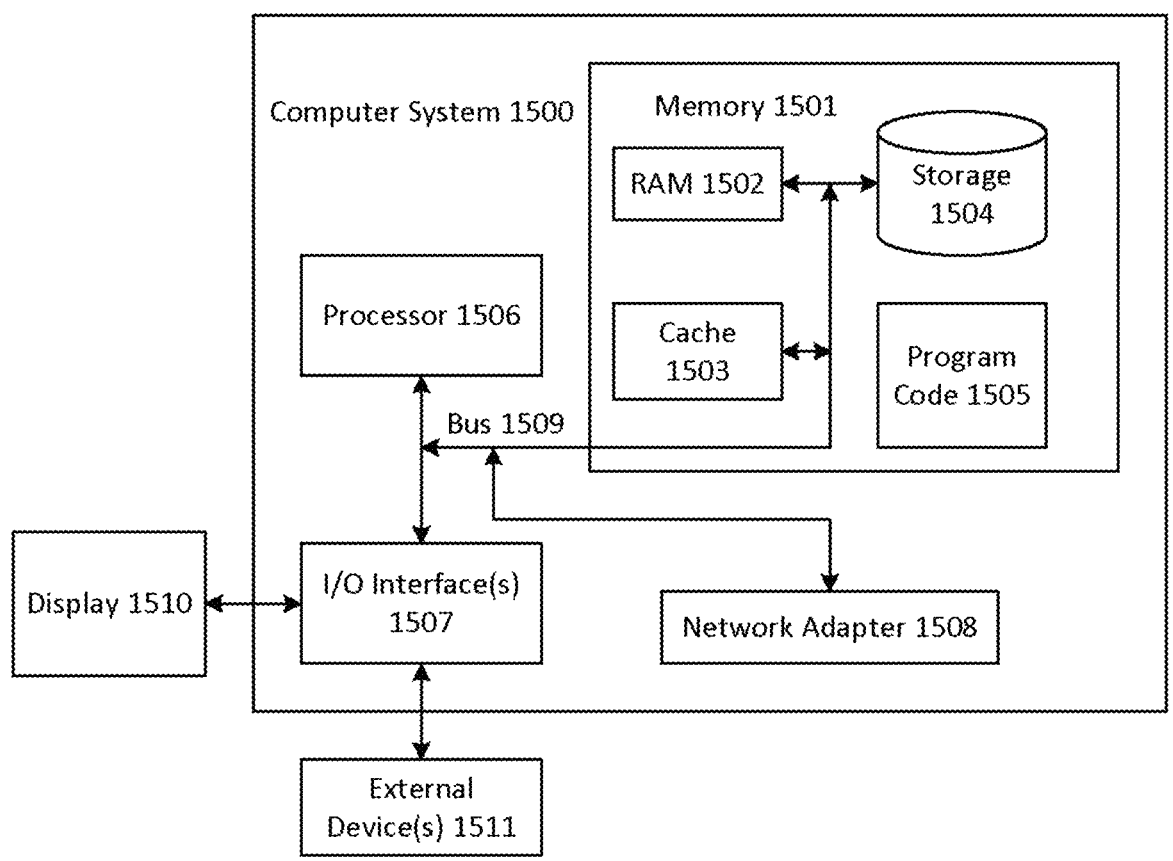
FIG. 15 illustrates a computer system according to embodiments of the present invention.

FIG. 15 illustrates a computer system according to embodiments of the present invention. One or more of the computer system are used to implement the client devices and servers illustrated in FIG. 1. The computer system 1500 is operationally coupled to a processor or processing units 1506, a memory 1501, and a bus 1509 that couples various system components, including the memory 1501 to the processor 1506. The bus 1509 represents one or more of any of several types of bus structure, including a memory bus or memory controller, a peripheral bus, an accelerated graphics port, and a processor or local bus using any of a variety of bus architectures. The memory 1501 may include computer readable media in the form of volatile memory, such as random access memory (RAM) 1502 or cache memory 1503, or non-volatile storage media 1504. The memory 1501 may include at least one program product having a set of at least one program code module 1505 that are configured to carry out the functions of embodiment of the present invention when executed by the processor 1506. The computer system 1500 may also communicate with one or more external devices 1511, such as a display 1510, via I/O interfaces 1507. The computer system 1500 may communicate with one or more networks via network adapter 1508.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for notification generation for a website, comprising:
   (a) receiving, by a server from a content delivery network, a request to create an event based on event data pertaining to a first user's interaction with a first instance of a website at a first client device;
   (b) in response to the request to create the event, creating, by the server, the event to comprise event parameters based on the event data, the event parameters comprising an identifier for the event, a template reference to a template for a notification message, one or more variable values, a timestamp, and a website identifier associated with the website;
   (c) in response to the creation of the event, sending, by the server to the content delivery network, a request to expire any event data currently stored in a cache at the content delivery network;
   (d) storing, by the server, the event in an events database;
   (e) in response to the request to expire from the server, expiring event data currently stored in the cache by the content delivery network;
   (f) receiving a first request for events stored in the events database and associated with the website identifier, from a second browser at a second client device displaying a second instance of the website, by the content delivery network;
   (g) responsive to the first request being a next request for events after the expiration of the cache, sending the first request to the server by the content delivery network;
   (h) responsive to receiving the first request, finding, by the server, the event in the events database associated with the website identifier;
   (i) finding, by the server, the template stored in a templates database and associated with the template reference in the event parameters of the event, the template comprising a message structure for the notification message;
   (j) determining, by the server, that the message structure in the template comprises one or more template variables and one or more message keys;
   (k) finding, by the server in a custom event fields database, one or more custom event fields comprising an event identifier matching the identifier for the event, each matching custom event field comprising a key-value pair;

(l) for each template variable in the message structure, replacing, by the server, the template variable with a corresponding variable value in the event parameters;
(m) for each message key in the message structure:
  (m1) matching, by the server, the message key to a key of a given key-value pair in a given custom event field of the one or more custom event fields, and
  (m2) replacing, by the server, the message key with a value of the given key-value pair;
(n) sending an event object to the second browser, by the server through the content delivery network, the event object comprising a message comprising the variable values replacing the message variables, a link, and the timestamp from the event parameters, the message further comprising the values in the one or more custom event fields replacing the one or more message keys, the message used by the second browser to create the notification message for display on the second instance of the website at the second client device;
(o) storing the event object in the cache by the content delivery network;
(p) receiving a second request for events associated with the website identifier after the first request, from a third browser at a third client device displaying a third instance of the website, by the content delivery network; and
(q) responding to the second request using the event object stored in the cache, by the content delivery network, without sending the second request to the server.

2. The method of claim 1, wherein for each template variable, the replacing (l) comprises:
  (l1) determining, by the server, whether a given template variable in the message structure in the template has a corresponding value in the event parameters in the event;
  (l2) in response to determining that the given template variable has the corresponding value in the event parameters, replacing, by the server, the given template variable with the corresponding value in the event parameters;
  (l3) in response to determining that the given template variable does not have a corresponding value in the event parameters, replacing, by the server, the given template variable with a default value.

3. The method of claim 2, wherein the given template variable comprises a pre-defined variable or a user-defined variable,
  wherein the pre-defined variable is supported by the server and available to users without additional user configuration,
  wherein the user-defined variable is defined by a second user.

4. The method of claim 1, wherein the event parameters of the event further comprise a uniform resource locator (URL), wherein the replacing (l) further comprises:
  (l1) determining, by the server, whether the message structure in the template comprises a special variable;
  (l2) in response to determining that the message structure in the template comprises the special variable, combining, by the server, one of the template variables with the URL in the event parameters of the event to form the link.

5. The method of claim 4, wherein the link further comprises one or more tracking parameters.

6. The method of claim 1, further comprising:
  (r) receiving, by the second browser from the server, the event object;
  (s) converting, by the second browser, the timestamp in the message comprised in the event object to a human-readable statement;
  (t) rendering, by the second browser, the notification message using the message and the link from the event object and the converted timestamp; and
  (u) displaying, by the second browser, the notification message to the second user interacting with the second instance of the website at the second client device.

7. The method of claim 1, wherein the storing (d) further comprises:
  (d1) searching, by the server, the templates database for the template associated with the template reference in the event parameters;
  (d2) when the template is found in the templates database, storing, by the server, the event in the events database; and
  (d3) when the template is not found in the templates database, generating an error message by the server.

8. The method of claim 7, wherein the storing (d2) further comprises:
  (d2i) when the template is found in the templates database, determining, by the server, whether each template variable in the template has a corresponding variable value in the event parameters in the event;
  (d2ii) when each template variable has the corresponding variable value in the event parameters, storing the event in the events database;
  (d2iii) when a given template variable does not have the corresponding variable value in the event parameters, determining, by the server, whether a fall back value is configured for the given template variable;
  (d2iv) when the fall back value is not configured for the given template variable, ignoring the event data by the server; and
  (d2v) when the fall back value is configured for the given template variable, storing the event in the events database with the fall back value.

9. A non-transitory computer readable medium comprising computer readable program code embodied therein, wherein when executed by a processor causes the processor to:
  (a) receive, by a server from a content delivery network, a request to create an event based on event data pertaining to a first user's interaction with a first instance of a website at a first client device;
  (b) in response to the request to create the event, create, by the server, the event to comprise event parameters based on the event data, the event parameters comprising an identifier for the event, a template reference to a template for a notification message, one or more variable values, a timestamp, and a website identifier associated with the website;
  (c) in response to the creation of the event, send, by the server to the content delivery network, a request to expire any event data currently stored in a cache at the content delivery network;
  (d) store, by the server, the event in an events database;
  (e) in response to the request to expire from the server, expire event data currently stored in the cache by the content delivery network;
  (f) receive a first request for events stored in the events database and associated with the website identifier, from a second browser at a second client device displaying a second instance of the website, by the content delivery network;

(g) responsive to the first request being a next request for events after the expiration of the cache, send the first request to the server by the content delivery network;

(h) responsive to receiving the first request, find, by the server, the event in the events database associated with the website identifier;

(i) find, by the server, the template stored in a templates database and associated with the template reference in the event parameters of the event, the template comprising a message structure for the notification;

(j) determine, by the server, that the message structure in the template comprises one or more template variables and one or more message keys;

(k) find, by the server in a custom event fields database, one or more custom event fields comprising an event identifier matching the identifier for the event, each matching custom event field comprising a key-value pair;

(l) for each template variable in the message structure, replace, by the server, the template variable with a corresponding variable value in the event parameters;

(m) for each message key in the message structure:
(m1) match, by the server, the message key to a key of a given key-value pair in a given custom event field of the one or more custom event fields, and
(m2) replace, by the server, the message key with a value of the given key-value pair;

(n) send an event object to the second browser, by the server through the content delivery network, the event object comprising a message comprising the variable values replacing the message variables, a link, and the timestamp from the event parameters, the message further comprising the values in the one or more custom event fields replacing the one or more message keys, the message used by the second browser to create the notification message for display on the second instance of the website at the second client device;

(o) store, by the content delivery network, the event object in the cache;

(p) receive a second request for events associated with the website identifier after the first request, from a third browser at a third client device displaying a third instance of the website, by the content delivery network; and (q) respond to the second request using the event object stored in the cache, by the content delivery network, without sending the second request to the server.

10. The medium of claim 9, wherein for each template variable, the replace (l1) comprises:
(l1) determine whether a given template variable in the message structure in the template has a corresponding value in the event parameters in the event;
(l2) in response to determining that the given template variable has the corresponding value in the event parameters, replace the given template variable with the corresponding value in the event parameters;
(l3) in response to determining that the given template variable does not have a corresponding value in the event parameters, replace the given template variable with a default value.

11. The medium of claim 9, wherein the event parameters of the event further comprise a uniform resource locator (URL), wherein the replace (l) further comprises:

(l1) determine whether the message structure in the template comprises a special variable;
(l2) in response to determining that the message structure in the template comprises the special variable, combine one of the template variables with the URL in the event parameters of the event to form the link.

12. The medium of claim 9, further comprising:
(r) receive, by the second browser, the event object;
(s) convert, by the second browser, the timestamp in the message comprised in the event object to a human-readable statement;
(t) render, by the second browser, the notification message using the message and the link from the event object and the converted timestamp; and
(u) display, by the second browser, the notification message to the second user interacting with the second instance of the website at the second client device.

13. A system, comprising:
a first client device comprising a first browser displaying a first instance of a website;
a second client device comprising a second browser displaying a second instance of the web site;
a content delivery network comprising a cache; and
a server, wherein the server and the content delivery network:
(a) receives, by the server from the content delivery network, a request to create an event based on event data pertaining to a first user's interaction with the first instance of the website at the first client device;
(b) in response to the request to create the event, creates, by the server, the event to comprise event parameters based on the event data, the event parameters comprising an identifier for the event, a template reference to a template for a notification message, one or more variable values, a timestamp, and a website identifier associated with the website;
(c) in response to the creation of the event, sends, by the server to the content delivery network, a request to expire any event data currently stored in a cache at the content delivery network;
(d) stores, by the server, the event in an events database;
(e) in response to the request to expire from the server, expires event data currently stored in the cache by the content delivery network;
(f) receives, by the content delivery network, a first request for events stored in the events database and associated with the website identifier, from a second browser at a second client device displaying a second instance of the website;
(g) responsive to the first request being a next request for events after the expiration of the cache, sends the first request to the server by the content delivery network;
(h) responsive to receiving the first request, finds, by the server, the event in the events database associated with the website identifier;
(i) finds, by the server, the template stored in a templates database and associated with the template reference in the event parameters of the event, the template comprising a message structure for the notification message comprising one or more template variables;
(j) determines, by the server, that the message structure in the template comprises one or more template variables and one or more message keys;
(k) finds, by the server in a custom event fields database, one or more custom event fields comprising an event identifier matching the identifier for the event, each matching custom event field comprising a key-value pair;

(l) for each template variable in the message structure, replaces, by the server, the template variable with a corresponding variable value in the event parameters;

(m) for each message key in the message structure:
   (m1) matches, by the server, the message key to a key of a given key-value pair in a given custom event field of the one or more custom event fields, and
   (m2) replaces, by the server, the message key with a value of the given key-value pair;

(n) sends an event object to the second browser, by the server through the content delivery network, the event object comprising a message comprising the variable values replacing the message variables, a link, and the timestamp from the event, the message further comprising the values in the one or more custom event fields replacing the one or more message keys, the message used to create the notification message to be displayed on the second instance of the website at the second client device;

(o) stores, by the content delivery network, the event object in the cache;

(p) receives a second request for events associated with the website identifier after the first request, from a third browser at a third client device displaying a third instance of the website, by the content delivery network; and (q) responds to the second request using the event object stored in the cache, by the content delivery network, without sending the second request to the server.

14. The system of claim 13, wherein for each template variable, the replaces (l) comprises:
   (l1) determines whether a given template variable in the message structure in the template has a corresponding value in the event parameters in the event;
   (l2) in response to determining that the given template variable has the corresponding value in the event parameters, replaces the given template variable with the corresponding value in the event parameters;
   (l3) in response to determining that the given template variable does not have a corresponding value in the event parameters, replaces the given template variable with a default value.

15. The system of claim 13, wherein the event parameters of the event further comprise a uniform resource locator (URL), wherein the replaces (l) further comprises:
   (l1) determines whether the message structure in the template comprises a special variable;
   (l2) in response to determining that the message structure in the template comprises the special variable, combines one of the template variables with the URL in the event parameters of the event to form the link.

16. The system of claim 13, wherein the second browser:
(r) receives the event object;
(s) converts the timestamp in the message comprised in the event object to a human-readable statement;
(t) renders the notification message using the message and the link from the event object and the converted timestamp; and
(u) displays the notification message to the second user interacting with the second instance of the website at the second client device.

\* \* \* \* \*